(12) United States Patent
Chen et al.

(10) Patent No.: US 9,513,670 B2
(45) Date of Patent: Dec. 6, 2016

(54) TOUCH PANEL AND MANUFACTURING METHOD OF TOUCH DISPLAY PANEL

(71) Applicant: AU Optronics Corporation, Hsin-Chu (TW)

(72) Inventors: Yi-Chi Chen, Hsin-Chu (TW); Chia-Chun Yeh, Hsin-Chu (TW); Chien-Yu Chen, Hsin-Chu (TW); Yi-Ling Lin, Hsin-Chu (TW); Yi-Hsin Lin, Hsin-Chu (TW)

(73) Assignee: AU OPTRONICS CORPORATION, Hsin-Chu (TW)

( * ) Notice: Subject to any disclaimer, the term of this patent is extended or adjusted under 35 U.S.C. 154(b) by 247 days.

(21) Appl. No.: 14/165,812

(22) Filed: Jan. 28, 2014

(65) Prior Publication Data
US 2014/0362306 A1    Dec. 11, 2014

(30) Foreign Application Priority Data

Jun. 11, 2013   (TW) .............................. 102120740 A

(51) Int. Cl.
*G06F 1/16*    (2006.01)
*G06F 3/041*   (2006.01)

(52) U.S. Cl.
CPC .......... *G06F 1/1656* (2013.01); *G06F 3/0412* (2013.01); *Y10T 29/49105* (2015.01)

(58) Field of Classification Search
None
See application file for complete search history.

(56) References Cited

U.S. PATENT DOCUMENTS

| 8,184,105 B2 | 5/2012 | Lin et al. |
| 2010/0302750 A1* | 12/2010 | Chen .................... H05K 1/0268 361/792 |
| 2014/0016043 A1* | 1/2014 | Chen ...................... G06F 3/041 349/12 |

FOREIGN PATENT DOCUMENTS

| CN | 103019451 | 4/2013 |
| TW | M434257 | 7/2014 |

* cited by examiner

*Primary Examiner* — Jason Olson
*Assistant Examiner* — Parul Gupta
(74) *Attorney, Agent, or Firm* — WPAT, PC; Justin King; Douglas Hosack

(57) ABSTRACT

A touch panel including a substrate, at least one touch-sensing unit, at least one connecting pad, at least a testing line, at least one ESD protection circuit, and a first isolation layer is provided. The touch-sensing unit is disposed on the substrate. The connecting pad is disposed on the substrate and electrically connected to the touch-sensing unit. The testing line is disposed on the substrate, electrically connected to the connecting pad, and extends to at least an edge of the substrate. The ESD protection circuit is disposed in the edge of the substrate and electrically connected to a ground voltage, wherein a vertical projection of the testing line to the substrate and that of the ESD protection circuit to the substrate is at least partially overlapped. The first isolation layer is disposed between the testing line and the ESD protection circuit.

12 Claims, 13 Drawing Sheets

TOUCH PANEL AND MANUFACTURING METHOD OF TOUCH DISPLAY PANEL

RELATED APPLICATIONS

This application claims priority to Taiwan Application Serial Number 102120740, filed Jun. 11, 2013, which is herein incorporated by reference.

BACKGROUND

Field of Invention

The present invention relates to a panel. More particularly, the present invention relates to a touch panel.

Description of Related Art

For user-oriented demand, operational convenience of the electronic products is more and more important. Therefore, electronic products with touch panels, such as smart phones and tablet computers, have gradually become the mainstream on electronic products market, in which the touch panel is of course the important and indispensable part of the electronic products. However, while electrostatic test is performed on finished or semi-finished touch panels, the finished or semi-finished touch panels are often damaged by static electricity.

SUMMARY

The present disclosure relates to a touch panel. The touch panel has at least one ESD protection circuit to evacuate the static electricity generated during the electrostatic tests or product assembling. Therefore, the devices of the touch panel, such as a flexible circuit board, a printed circuit board assembly, or the touch-sensing unit would not be damaged by the static electricity.

The present disclosure, in one aspect, relates to a touch panel including a substrate, at least one touch-sensing unit, at least one connecting pad, at least one ESD protection circuit, and a first isolation layer. The touch-sensing unit is disposed on the substrate. The connecting pad is disposed on the substrate, and the connecting pad is electrically connected to the touch-sensing unit. The testing line is disposed on the substrate, and the testing line is electrically connected to the connecting pad, and the testing line is extending to at least one edge of the substrate. The ESD protection circuit is disposed at the edge of the substrate. The ESD protection circuit is electrically grounded. A vertical projection of the testing line on the substrate is at least partially overlapped to a vertical projection of the ESD protection circuit on the substrate. The first isolation layer is disposed between the testing line and the ESD protection circuit.

In one embodiment of the present disclosure, the ESD protection circuit is disposed between the substrate and the testing line.

In one or more embodiments of the present disclosure, the testing line is disposed between the substrate and the ESD protection circuit.

In one or more embodiments of the present disclosure, the touch panel further includes at least one grounding pad, a second isolation layer, and at least one ESD connecting line. The grounding pad is disposed on the substrate. The second isolation layer covers the substrate, the touch-sensing unit, the testing line, the ESD protection circuit and the first isolation layer. The second isolation layer has at least one through hole to expose the grounding pad. The ESD connecting line is electrically connected to the ESD protection circuit and the grounding pad.

In one or more embodiments of the present disclosure, the first isolation layer is disposed between the ESD connecting line and the testing line.

In one or more embodiments of the present disclosure, the ESD connecting line includes a line portion and a plug portion. The first isolation layer is disposed between the ESD protection circuit and the line portion. The first isolation layer has at least one through hole. The plug portion of the ESD connecting line penetrates the through hole of the first isolation layer to be electrically connected the ESD protection circuit.

In one or more embodiments of the present disclosure, the touch panel further includes an outer frame, a second isolation layer, a flexible circuit board, and a printed circuit board assembly. The outer frame is electrically connected to the ESD protection circuit. The second isolation layer covers the substrate, the touch-sensing unit, the testing line, the ESD protection circuit and the first isolation layer. The second isolation layer has at least one through hole to expose the connecting pad. The flexible circuit board is electrically connected to the connecting pad through the through hole of the second isolation layer. A printed circuit board assembly is electrically connected to the flexible circuit board.

In one or more embodiments of the present disclosure, the testing line is disposed between the substrate and the ESD protection circuit, and the touch panel further includes an outer frame, a second isolation layer, and a conductive adhesive. The outer frame is electrically connected to the ESD protection circuit. The second isolation layer covers the substrate, the touch-sensing unit, the testing line and the first isolation layer. The second isolation layer has at least one through hole. The through hole of the second isolation layer exposes at least a portion of the ESD protection circuit. The conductive adhesive is filled in the through hole of the second isolation layer to electrically connect the ESD protection circuit and the outer frame.

In one or more embodiments of the present disclosure, the ESD protection circuit is disposed between the substrate and the testing line. The touch panel further includes an outer frame, a second isolation layer, and a conductive adhesive. The outer frame is electrically connected to the ESD protection circuit. The second isolation layer covers the substrate, the touch-sensing unit, the testing line and the first isolation layer. The second isolation layer has at least one through hole, and the first isolation layer also has at least one through hole. The through hole of the first isolation layer and the through hole of the second isolation layer are connected with each other to expose at least a portion of the ESD protection circuit. The conductive adhesive is filled in the through hole of the first isolation layer and the through hole of the second isolation layer such that the ESD protection circuit and the outer frame are electrically connected.

In one or more embodiments of the present disclosure, the material of the ESD protection circuit includes titanium, molybdenum, chromium, iridium, aluminum, copper, silver, gold, indium tin oxide, indium zinc oxide, or combinations thereof. A resistance of the ESD protection circuit is less than or equal to that of the testing line. The ESD protection circuit crosses the testing line. A line width of the ESD protection circuit is about 150-2000 μm. The touch panel further includes a second isolation layer. The second isolation layer covers the substrate, the touch-sensing unit, the testing line, the ESD protection circuit and the first isolation layer, wherein a side surface of the ESD protection circuit is exposed by the first isolation layer or the second isolation layer.

The present disclosure, in another aspect, relates to a method of manufacturing a touch display panel. The method includes forming at least one touch-sensing unit, at least one connecting pad, at least one testing line and at least one ESD protection circuit on a motherboard. The connecting pad is electrically connected to the touch-sensing unit, and the testing line is electrically connected to the connecting pad. The method also includes inputting a testing signal through the testing line to test the touch-sensing unit, and cutting the motherboard, the testing line and the ESD protection circuit along at least one cutting line to form at least one touch panel. Both of the testing line and the ESD protection circuit are exposed from a side surface of the touch panel. The method also includes performing an electrostatic test to the touch panel, and assembling the touch panel and a display panel.

These and other features, aspects, and advantages of the present invention will become better understood with reference to the following description and appended claims. It is to be understood that both the foregoing general description and the following detailed description are by examples, and are intended to provide further explanation of the invention as claimed.

BRIEF DESCRIPTION OF THE DRAWINGS

The invention can be more fully understood by reading the following detailed description of the embodiment, with reference made to the accompanying drawings as follows.

DETAILED DESCRIPTION

Figure 1:
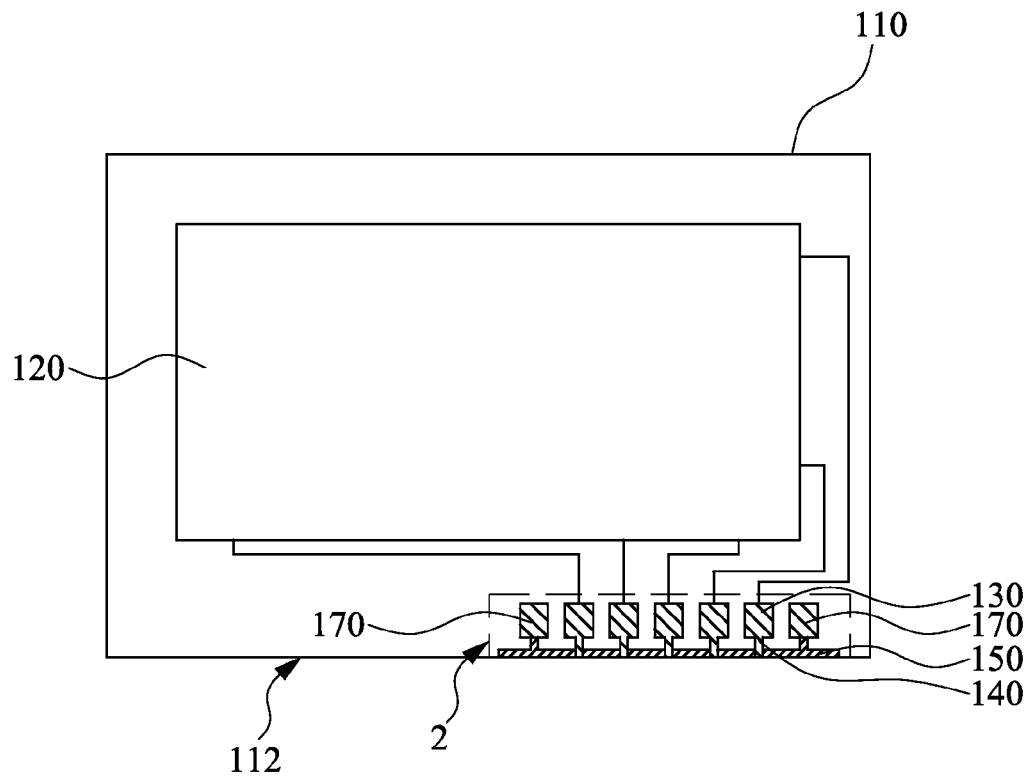
FIG. 1 illustrates a top-view of a touch panel according to first embodiment of the present disclosure.

The present disclosure is described by the following specific embodiments. Those with ordinary skill in the arts can readily understand the other advantages and functions of the present invention after reading the disclosure of this specification. The present disclosure can also be implemented with different embodiments. Various details described in this specification can be modified based on different viewpoints and applications without departing from the scope of the present disclosure.

As used herein, the singular forms "a," "an" and "the" include plural referents unless the context clearly dictates otherwise. Therefore, reference to, for example, a data sequence includes aspects having two or more such sequences, unless the context clearly indicates otherwise.

Reference will now be made in detail to the embodiments of the present disclosure, examples of which are illustrated in the accompanying drawings. Wherever possible, the same reference numbers are used in the drawings and the description to refer to the same or like parts.

Figure 2:
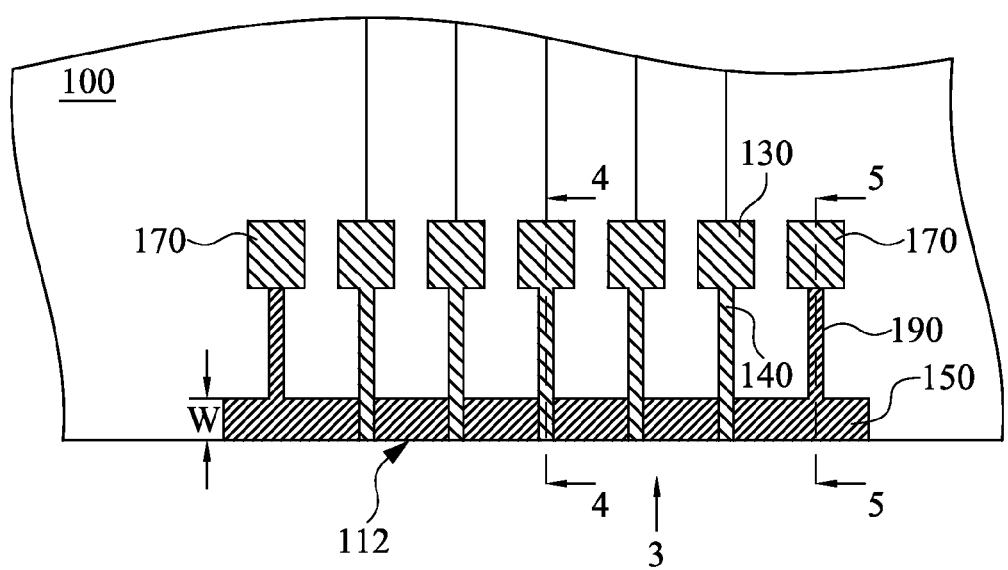
FIG. 2 illustrates an enlarged view of portion 2 of FIG. 1.
Figure 3:
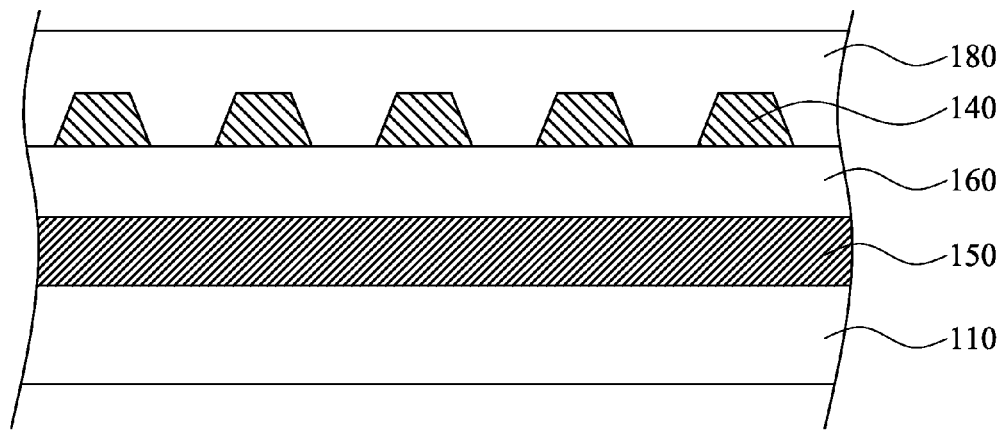
FIG. 3 illustrates a side view of FIG. 2 from direction 3 of FIG. 2.

FIG. 1 illustrates a top-view of a touch panel 100 according to the first embodiment of the present disclosure. FIG. 2 illustrates an enlarged view of portion 2 of FIG. 1. FIG. 3 illustrates a side view of FIG. 2 from a direction 3 of FIG. 2. As shown in FIGS. 1-3, the touch panel 100 includes a substrate 110, a touch-sensing unit 120 disposed on the substrate 110, connecting pads 130, testing lines 140, an ESD protection circuit 150, and a first isolation layer 160. The connecting pads 130 are electrically connected to the touch-sensing unit 120. The testing lines 140 are electrically connected to the connecting pads 130 respectively. The testing lines 140 are extending to an edge 112 of the substrate 110. The ESD protection circuit 150 is disposed at the edge 112 of the substrate 110. The ESD protection circuit 150 is electrically grounded. A vertical projection of the testing line 140 on the substrate 110 at least partially overlaps a vertical projection of the ESD protection circuit 150 on the substrate 110. The first isolation layer 160 is disposed between the testing line 140 and the ESD protection circuit 150. As illustrated in FIG. 2, a line width W of the ESD protection circuit 150 is, for example, 150-2000 μm. Preferably the line width W of the ESD protection circuit 150 is 1000 μm. However, the present disclosure is not limited thereto.

Since the ESD protection circuit 150 is electrically grounded. When static electricity is generated at the edge 112 of the substrate 110, the generated static electricity would be conducted to the ESD protection circuit 150 and grounded without entering the touch panel 100 through the testing lines 140. Therefore, devices, which are electrically connected to the testing lines 140, would not be damaged by static electricity.

Figure 4:
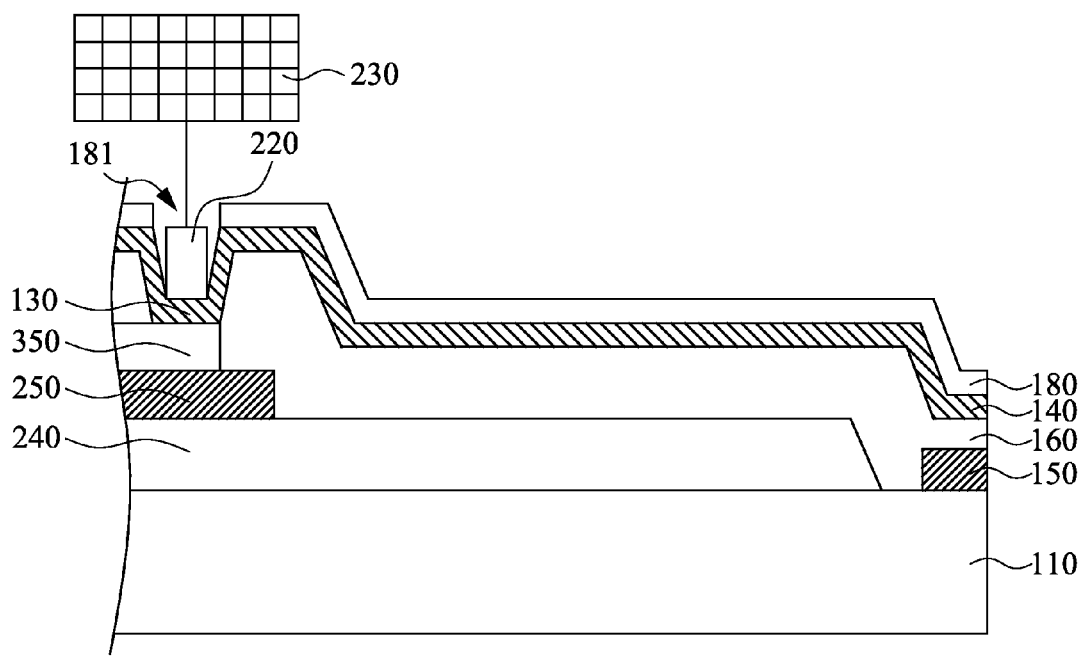
FIG. 4 illustrates a cross-sectional view along line 4 of FIG. 2.

FIG. 4 illustrates a cross-sectional view along a line 4 of FIG. 2. As shown in FIG. 4, the touch panel 100 according to various embodiments of the present disclosure further includes a second isolation layer 180, a flexible circuit board 220, and a printed circuit board assembly 230. The second isolation layer 180 covers the substrate 110, the touch-sensing unit 120, the testing lines 140, the ESD protection circuit 150, and the first isolation layer 160. The second isolation layer 180 has a through hole 181 to expose the connecting pad 130. The flexible circuit board 220 is electrically connected to the connecting pad 130 through the through hole 181. The printed circuit board assembly 230 is electrically connected to the flexible circuit board 220. Therefore, the printed circuit board assembly 230 could be electrically connected to the connecting pad 130 through the flexible circuit board 220. Accordingly, the printed circuit board assembly 230 could perform and control signals input/output to the touch-sensing unit 120 of the touch panel 100 in various embodiments of the present disclosure.

In addition, as illustrated in FIG. 4, the touch panel 100 according to various embodiments of the present disclosure may optionally include a black matrix layer 240, a first metal layer 250, and an electrode layer 350. The black matrix layer 240 may include opaque resins and be disposed on the substrate 110 to surround periphery area of the touch-sensing unit 120. The first metal layer 250 may include titanium (Ti), molybdenum (Mo), chromium (Cr), iridium (Ir), aluminum (Al), copper (Cu), silver (Ag), gold (Au), indium tin oxide (ITO), indium zinc oxide (IZO), or combinations thereof. The first metal layer 250 is utilized to form conductive traces, such as grounding lines, which are disposed on periphery area of the touch-sensing unit 120. As shown in FIG. 4, the black matrix layer 240 may be disposed between the first metal layer 250 and the substrate 110. The electrode layer 350 may be indium tin oxide (ITO), indium zinc oxide (IZO), or other suitable metal oxides. The electrode layer 350 is utilized to form touch-sensing electrodes of the touch-sensing unit 120.

Figure 5:
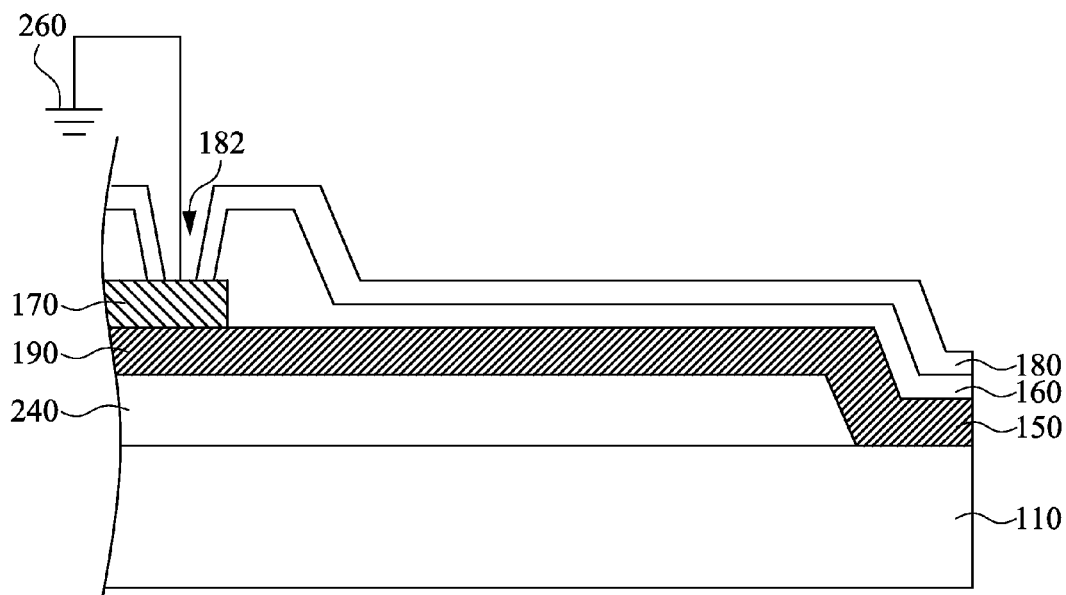
FIG. 5 illustrates a cross-sectional along line 5 of FIG. 2.

FIG. 5 illustrates a cross-sectional along a line 5 of FIG. 2. As shown in FIG. 5, the touch panel 100 according to various embodiments of the present disclosure may further include a grounding pad 170 and an ESD connecting line 190. The grounding pad 170 is disposed on the substrate 110. The ESD connecting line 190 is electrically connected to the ESD protection circuit 150 and the grounding pad 170. In various embodiments of the present disclosure, the second isolation layer 180 further includes a through hole 182 to expose the grounding pad 170. Therefore, a ground potential 260 can be electrically connected to the grounding pad 170 through the through hole 182. In addition, as illustrated in FIG. 5, in various embodiments of the present disclosure, the touch panel 100 may optionally include the black matrix layer 240. The black matrix layer 240 is similar to aforementioned in FIG. 4, and therefore the details are omitted here.

In detail, when static electricity is generated at the edge 112 of the substrate 110, the static electricity would be conducted through the ESD protection circuit 150, the ESD connecting line 190, the grounding pad 170, and grounded by the ground potential 260. In other words, the ESD protection circuit 150, the ESD connecting line 190, and the grounding pad 170 construct an evacuation path for the static electricity. Therefore, the static electricity generated at the edge 112 of the substrate 110 would not be accumulated at the edge 112. Accordingly, the possibility of the static electricity entering the touch panel 100 through the testing line 140 is significantly reduced.

As illustrated in FIG. 4 and FIG. 5, in various embodiments of the present disclosure, the first isolation layer 160 is disposed between the ESD connecting line 190 and the testing line. More specifically, in various embodiments of the present disclosure, the ESD protection circuit 150, the ESD connecting line 190, and the first metal layer 250 may be fabricated in the same conductive layer. However, the present disclosure is not limited thereto. The ESD protection circuit 150 and the ESD connecting line 190 may include titanium (Ti), molybdenum (Mo), chromium (Cr), iridium (Ir), aluminum (Al), copper (Cu), silver (Ag), gold (Au), indium tin oxide (ITO), indium zinc oxide (IZO), or combinations thereof.

In order to further improve the effects of the static electricity evacuation, the resistance of the ESD protection circuit 150 may be less than or equal to the resistance of the testing line 140. In other words, the resistance of the ESD protection circuit 150 may not be greater than that of the resistance of the testing line 140. Materials selection for the ESD protection circuit 150 may depend on the material of the testing line 140. For example, a material, which has a resistance equal to or smaller than 1% of that of the material of the testing line 140, can be selected to form the ESD protection circuit 150. As a result, most static electricity may be attracted by the ESD protection circuit 150 and enter the evacuation path without damaging devices which are electrically connected to the testing line 140.

Regarding the details of how the ground potential 260 electrically grounded, the ground potential 260 could be formed by bonding a ground potential of the flexible circuit board 220 on the grounding pad 170, or connecting an outer frame on the grounding pad 170. However, the present disclosure is not limited thereto.

In addition, as illustrated in FIG. 1 and FIG. 2, the extending direction of the ESD protection circuit 150 may be crossed to the extending direction of the testing line 140. The line width W of the ESD protection circuit 150 may be properly adjusted with accuracy of corresponding cutting processes. For example, the line width W of the ESD protection circuit 150 may be about 150-2000 μm. However, the present disclosure is not limited thereto. The line width W of the ESD protection circuit 150 may be properly determined as long as the ESD protection circuit 150 and the testing line 140 can be simultaneously exposed after corresponding cutting processes.

Figure 6:
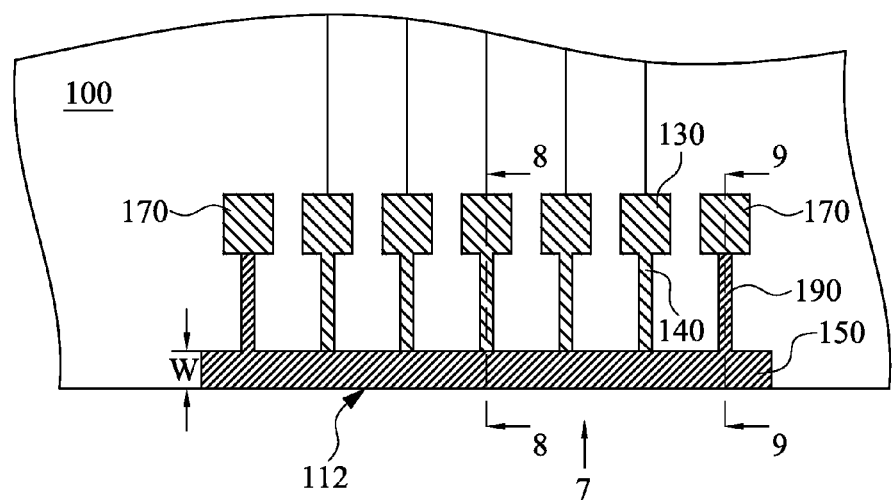
FIG. 6 illustrates an enlarged top-view of a portion of a touch panel according to the second embodiment of the present disclosure.
Figure 7:
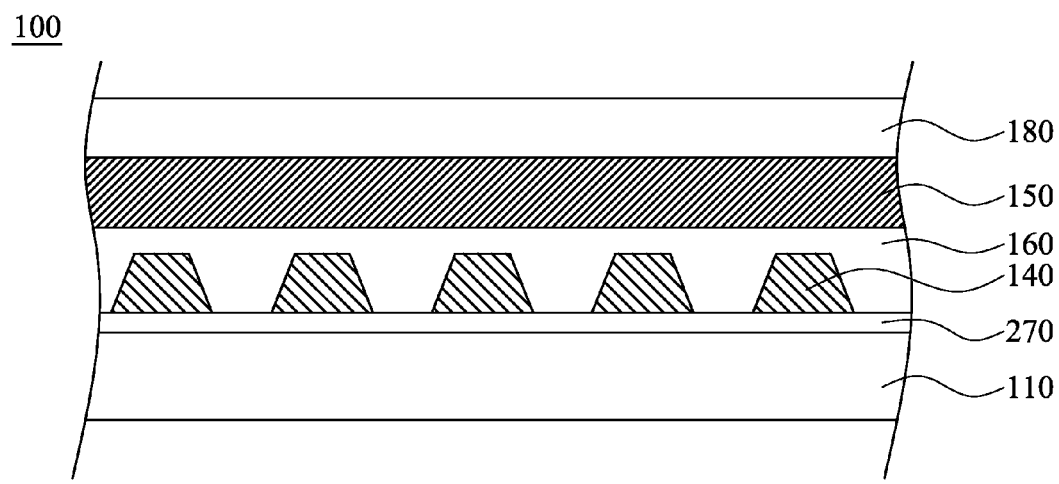
FIG. 7 illustrates a side view of FIG. 6 from direction 7 of FIG. 6.
Figure 8:
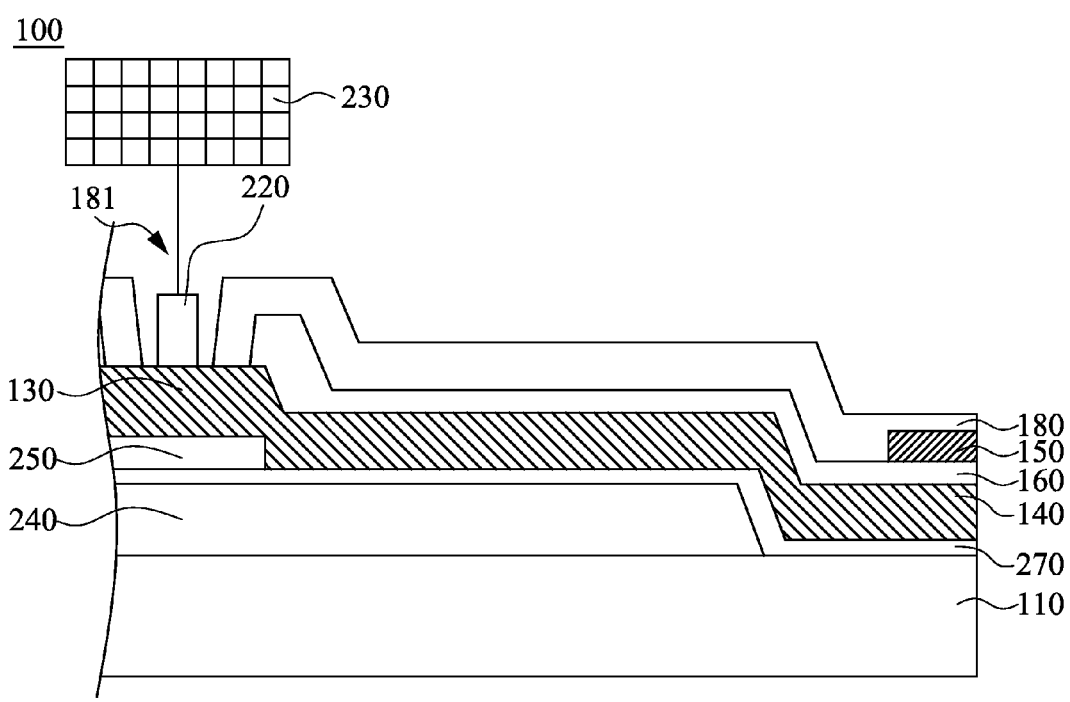
FIG. 8 illustrates a cross-sectional view of FIG. 6 along line 8 of FIG. 6.
Figure 9:
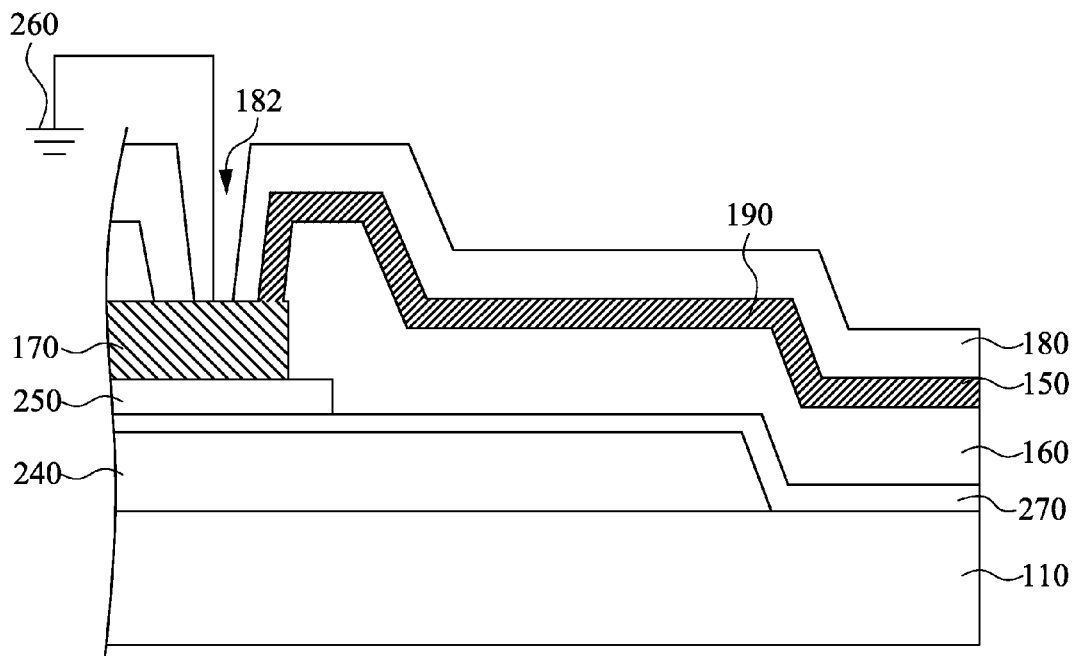
FIG. 9 illustrates a cross-sectional view of FIG. 6 along line 9 of FIG. 6.

FIG. 6 illustrates an enlarged top-view of a portion of a touch panel 100 according to second embodiment of the present disclosure. The position of the portion illustrated in FIG. 6 is the same as that illustrated in FIG. 2. FIG. 7 illustrates a side view of FIG. 6 from direction 7 of FIG. 6; FIG. 8 illustrates a cross-sectional view of FIG. 6 along line 8 of FIG. 6; and FIG. 9 illustrates a cross-sectional view of FIG. 6 along line 9 of FIG. 6. The difference between the second embodiment and the first embodiment is that the testing lines 140 are disposed between the substrate 110 and the ESD protection circuit 150. In other words, the ESD protection circuit 150 is disposed above the testing lines 140.

In addition, according to the second embodiment of the present disclosure, a passivation layer 270 may be optionally added between the testing line 140 and the substrate 110. Therefore, the risk of moisture penetrating the substrate 110 and rusting internal metal lines of the touch panel can be further reduced or eliminated. The passivation layer 270 may include silicon nitride or other suitable materials. Other details in structure of the second embodiment are similar to those of the first embodiment, and therefore the details are omitted here.

Figure 10:
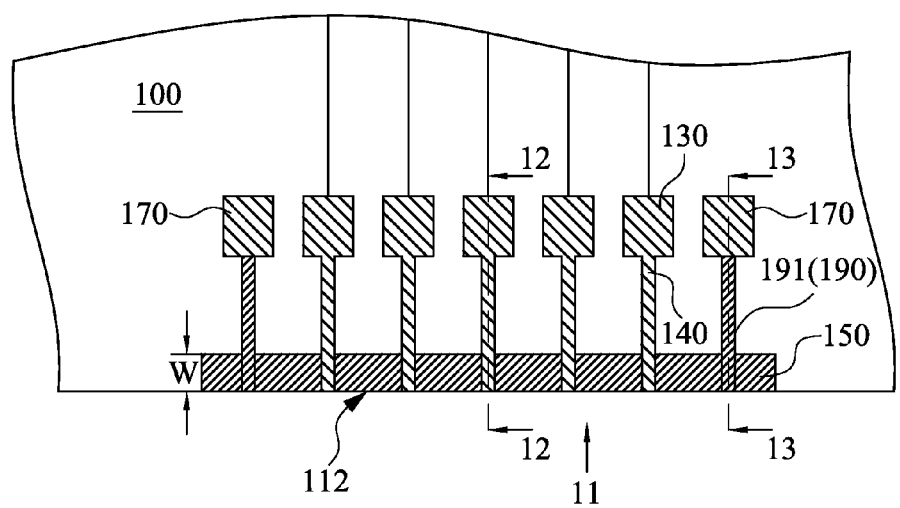
FIG. 10 illustrates an enlarged top-view of a portion of a touch panel according to the third embodiment of the present disclosure.
Figure 11:
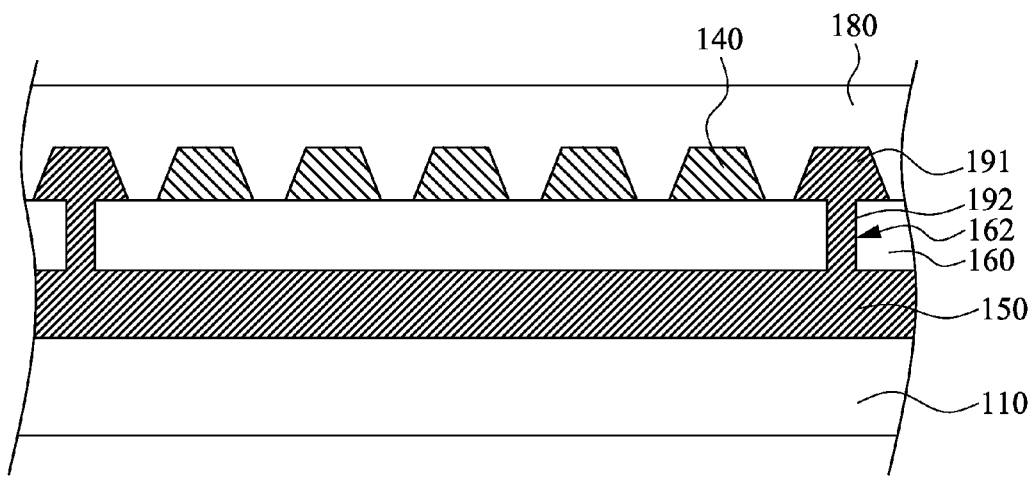
FIG. 11 illustrates a side view of FIG. 10 from direction 11 of FIG. 10.
Figure 12:
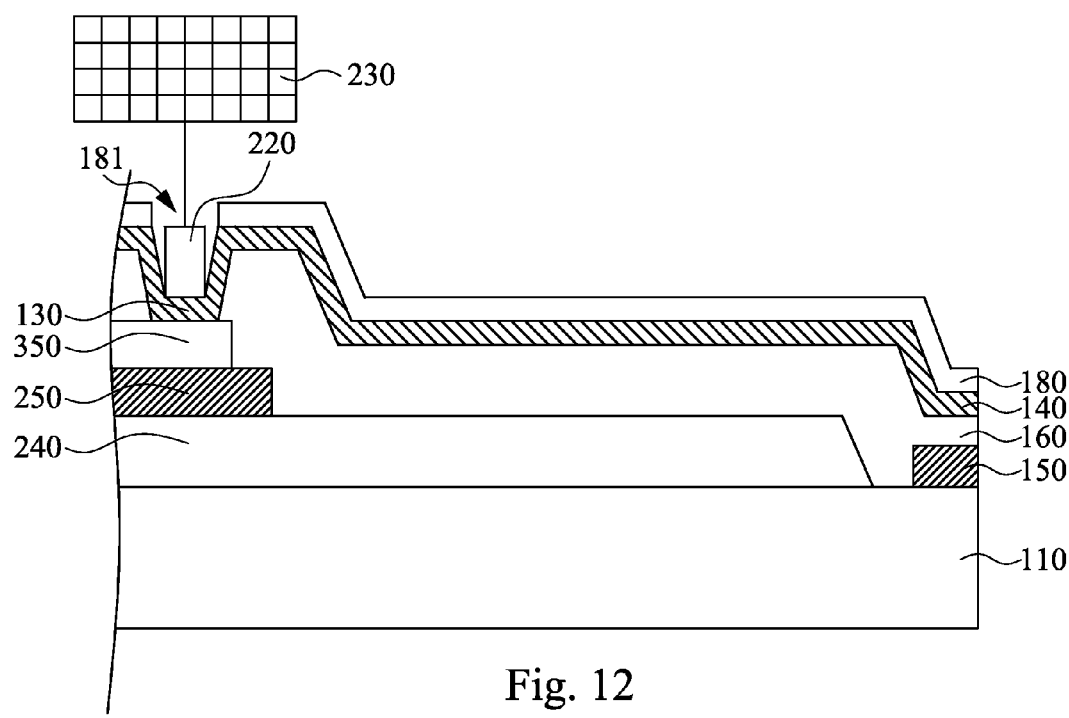
FIG. 12 illustrates a cross-sectional view of FIG. 10 along line 12 of FIG. 10.
Figure 13:
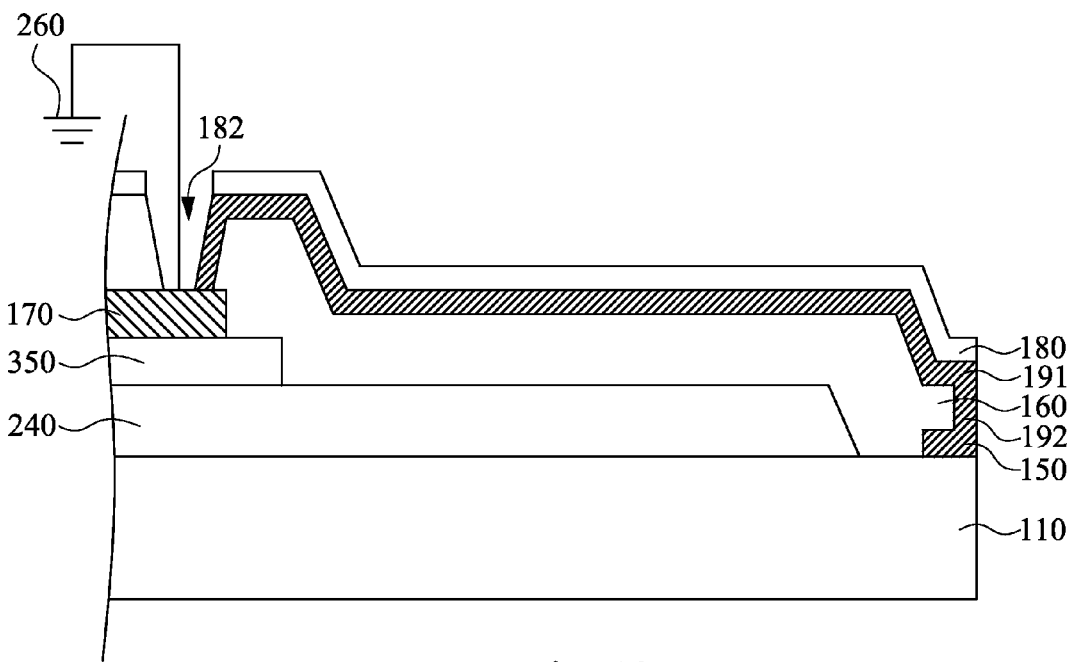
FIG. 13 illustrates a cross-sectional view of FIG. 10 along line 13 of FIG. 10.

FIG. 10 illustrates an enlarged top-view of a portion of a touch panel 100 according to third embodiment of the present disclosure. The position of the portion illustrated in FIG. 10 is the same as that illustrated in FIG. 2. FIG. 11 illustrates a side view of FIG. 10 from direction 11 of FIG. 10; FIG. 12 illustrates a cross-sectional view of FIG. 10 along line 12 of FIG. 10; and FIG. 13 illustrates a cross-sectional view of FIG. 10 along a line 13 of FIG. 10. The difference between the third embodiment and the first embodiment is that the ESD protection circuit 150 and the ESD connecting line 190 are respectively formed by different layers, and the ESD protection circuit 150 and the ESD connecting line 190 are separated by the first isolation layer 160. Specifically, the ESD connecting line 190 of the third embodiment includes a line portion 191 and a plug portion 192. The first isolation layer 160 is disposed between the ESD protection circuit 150 and the line portion 191, and the first isolation layer 160 has a through hole 162. The plug portion 192 of the ESD connecting line 190 penetrates the through hole 162 of the first isolation layer 160 such that the plug portion 192 is electrically connected to the ESD protection circuit 150.

According to the third embodiment of the present disclosure, when static electricity is generated at the edge 112 of the substrate 110, the static electricity of would be transferred through the ESD protection circuit 150, the plug portion 192, the line portion 191 and the grounding pad 170, and the static electricity would finally be electrically connected to the ground potential 260. In other words, the ESD protection circuit 150, the plug portion 192, the line portion 191 and the grounding pad 170 construct an evacuation path for the static electricity. Therefore, the static electricity generated at the edge 112 of the substrate 110 would not accumulate at the edge 112. Accordingly, the possibility of the static electricity entering the touch panel 100 through the testing line 140 is significantly reduced. Other details in structure of the third embodiment are similar to those of the first embodiment, and therefore the details are omitted here.

Figure 14:
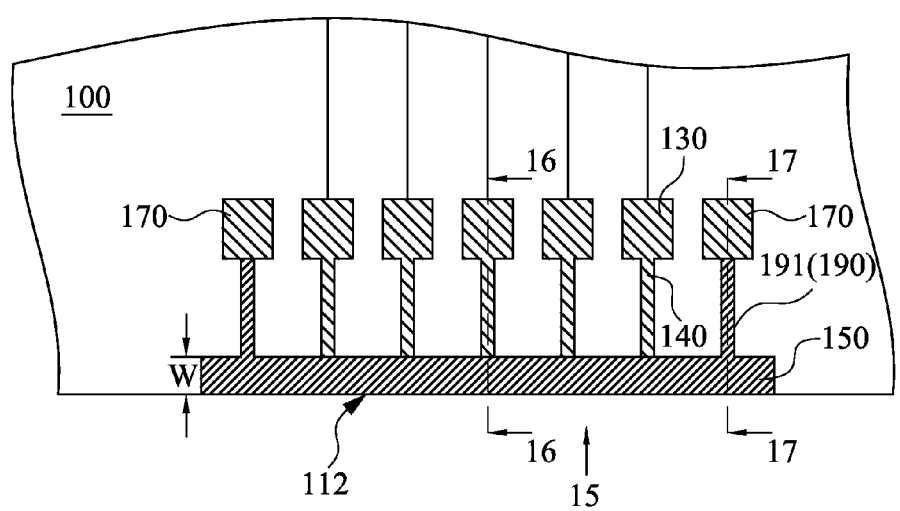
FIG. 14 illustrates an enlarged top-view of a portion of a touch panel according to the fourth embodiment of the present disclosure.
Figure 15:
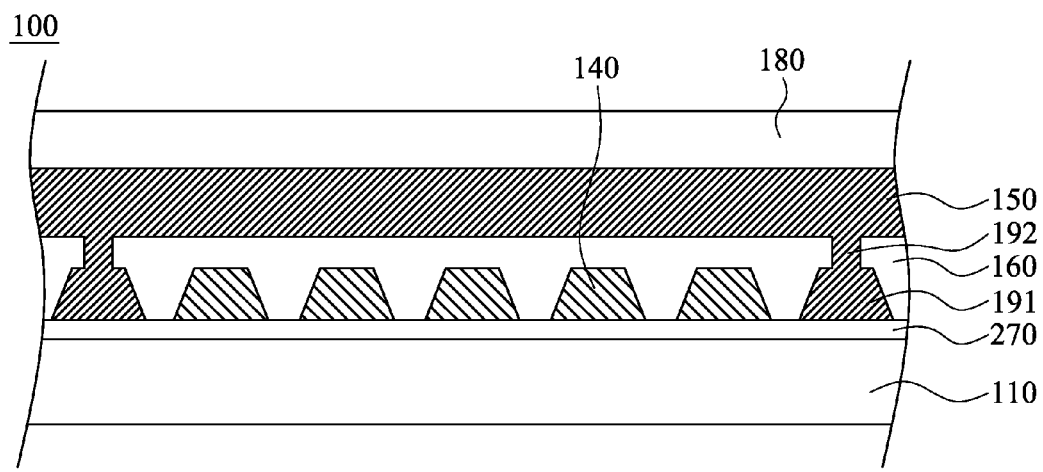
FIG. 15 illustrates a side view of FIG. 14 from direction 15 of FIG. 14.
Figure 16:
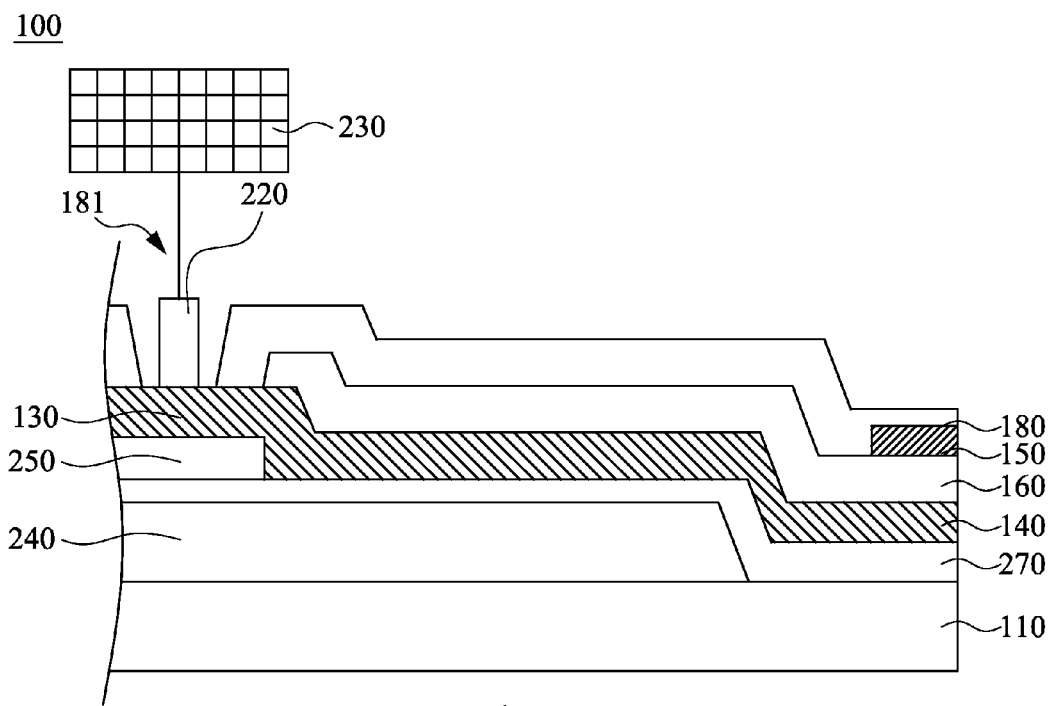
FIG. 16 illustrates a cross-sectional view of FIG. 14 along line 16 of FIG. 14.
Figure 17:
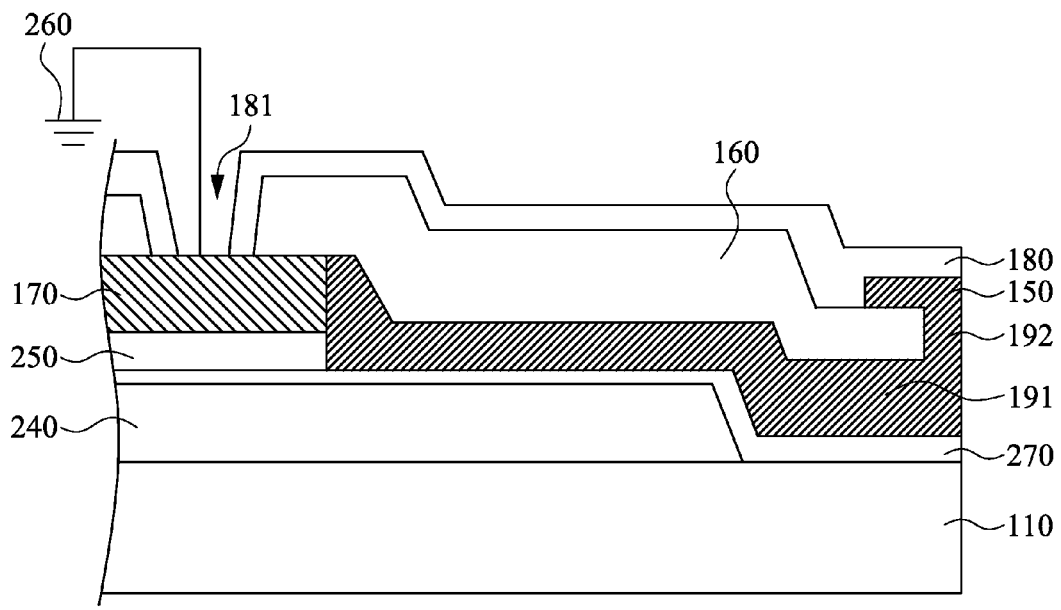
FIG. 17 illustrates a cross-sectional view of FIG. 14 along line 17 of FIG. 14.

FIG. 14 illustrates an enlarged top-view of a portion of a touch panel 100 according to fourth embodiment of the present disclosure. The position of the portion illustrated in FIG. 14 is the same as that illustrated in FIG. 2. FIG. 15 illustrates a side view of FIG. 14 from direction 15 of FIG. 14; FIG. 16 illustrates a cross-sectional view of FIG. 14 along line 16 of FIG. 14; and FIG. 17 illustrates a cross-sectional view of FIG. 14 along line 17 of FIG. 14. The difference between the fourth embodiment and the third embodiment is that the testing line 140 of the fourth embodiment of the present disclosure is disposed between the substrate 110 and the ESD protection circuit 150. In other words, the ESD protection circuit 150 is disposed above the testing line 140.

In addition, the passivation layer 270 may be optionally added between the testing line 140 and the substrate 110 according to the fourth embodiment of the present disclosure. The passivation 270 could reduce or eliminate the risk of moisture penetrating the substrate 110 and rusting internal metal lines of the touch panel. The passivation layer 270 may include silicon nitride or other suitable materials. Other details in structure of the fourth embodiment are similar to those of the third embodiment, and therefore the details are omitted here.

Figure 18:
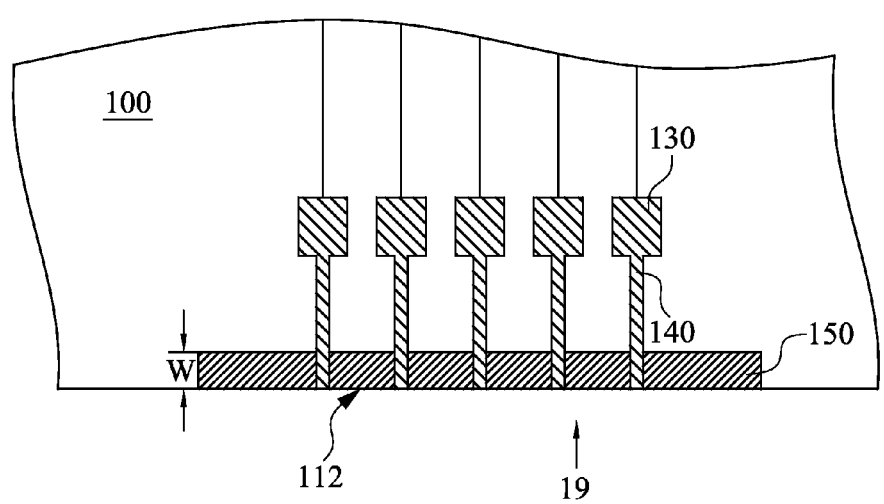
FIG. 18 illustrates an enlarged top-view of a portion of a touch panel according to the fifth embodiment of the present disclosure.
Figure 19:
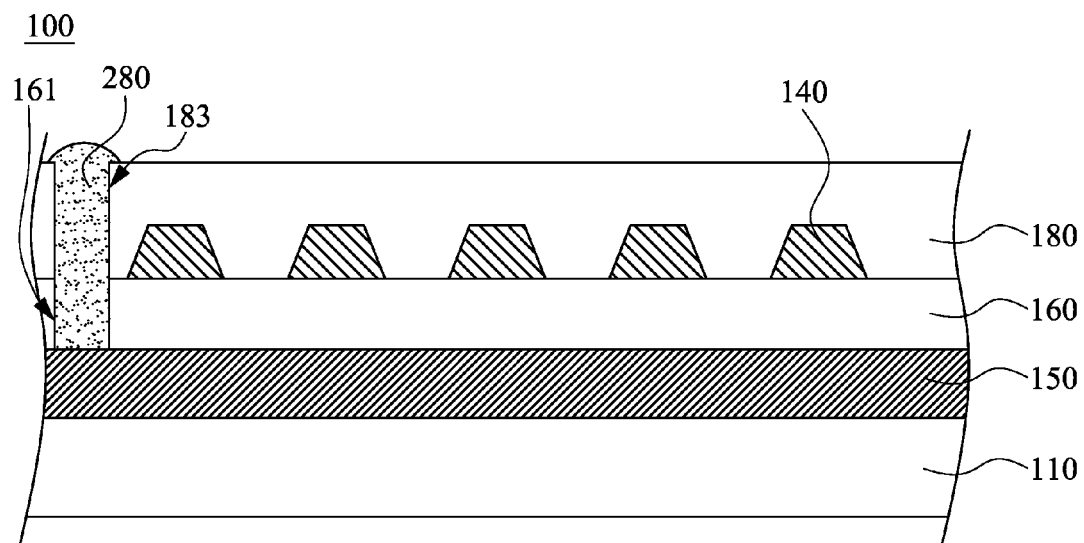
FIG. 19 illustrates a side view of FIG. 18 from direction 19 of FIG. 18.
Figure 20:
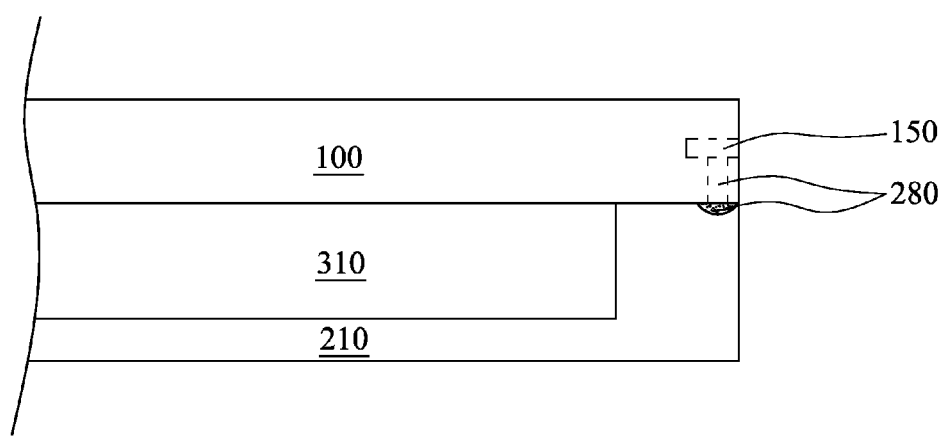
FIG. 20 is a schematic diagram illustrating an electrical connection between the ESD protection circuit and an outer frame in FIG. 18.

FIG. 18 illustrates an enlarged top-view of a portion of a touch panel 100 according to fifth embodiment of the present disclosure. The position of the portion illustrated in FIG. 18 is the same as that illustrated in FIG. 2. FIG. 19 illustrates a side view of FIG. 18 from direction 19 of FIG. 18. FIG. 20 is a schematic diagram illustrating an electrical connection between the ESD protection circuit 150 and an outer frame 210 in FIG. 18. The difference between the fifth embodiment and the first embodiment is that the touch panel 100 of the fifth embodiment of the present disclosure further includes the outer frame 210. The outer frame 210 is electrically connected to the ESD protection circuit 150 such that the ESD protection circuit 150 could be electrically connected to the ground potential. More specifically, the second isolation layer 180 has at least one through hole 183, and the first isolation layer 160 also has at least one through hole 161. The through hole 161 of the first isolation layer 160 and the through hole 183 of the second isolation layer 180 are connected with each other to expose at least partial the ESD protection circuit 150. A conductive adhesive 280 is filled in the through hole 161 of the first isolation layer 160 and the through hole 183 of the second isolation layer 180. The outer frame 210 contacts the conductive adhesive 280 such that the ESD protection circuit 150 and the outer frame 210 are electrically connected. In addition, as illustrated in FIG. 20, the touch panel 100 according to the fifth embodiment of the present disclosure may be optionally combined with a display module 310 to form a touch display panel. The display module 310 may be, for example, surrounded by the outer frame 210. A gap may be between the display module 310 and the outer frame 210. The display module 310 may be a liquid crystal display module, an organic light-emitting diode (OLED) display module, or other display module. Other details in structure of the fifth embodiment are similar to those of the first embodiment, and therefore the details are omitted here.

Figure 21:
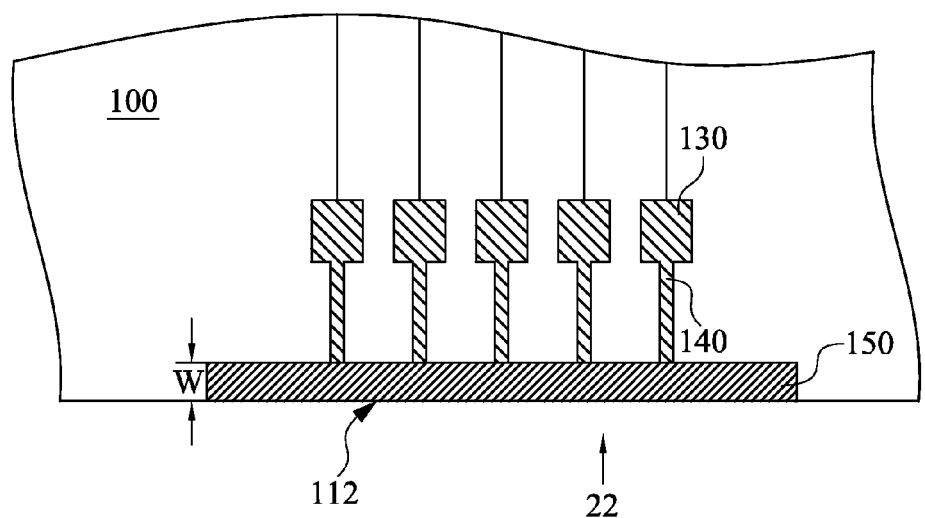
FIG. 21 illustrates an enlarged top-view of a portion of a touch panel according to the sixth embodiment of the present disclosure.
Figure 22:
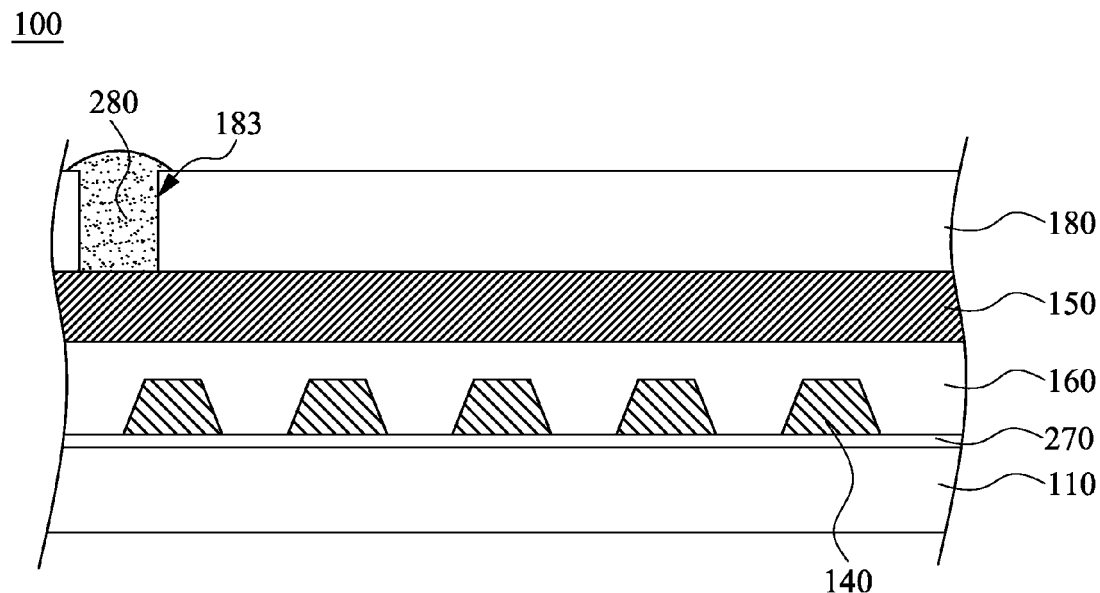
FIG. 22 illustrates a side view of FIG. 21 from direction 22 of FIG. 21.
Figure 23:
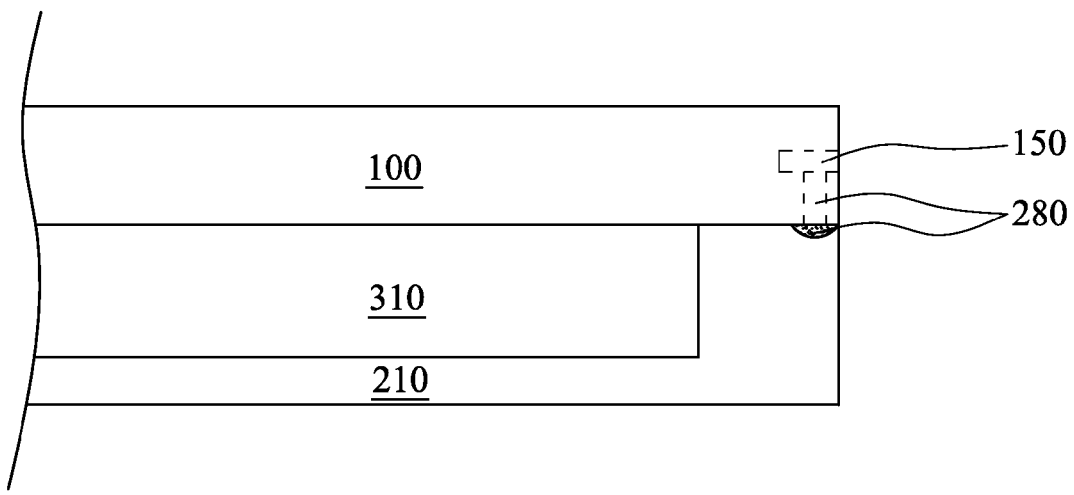
FIG. 23 is a schematic diagram illustrating an electrical connection between the ESD protection circuit and an outer frame in FIG. 21.

FIG. 21 illustrates an enlarged top-view of a portion of a touch panel 100 according to sixth embodiment of the present disclosure. The position of the portion illustrated in FIG. 21 is the same as that illustrated in FIG. 2. FIG. 22 illustrates a side view of FIG. 21 from direction 22 of FIG. 21. FIG. 23 is a schematic diagram illustrating an electrical connection between the ESD protection circuit 150 and an outer frame 210 in FIG. 21. The difference between the sixth embodiment and the fifth embodiment is that the testing line 140 of the sixth embodiment of the present disclosure is disposed between the substrate 110 and the ESD protection circuit 150. In other words, the ESD protection circuit 150 is disposed above the testing line 140. Therefore, according to the sixth embodiment of the present disclosure, only the through hole 183 of the second isolation layer 180 is required, at least partial ESD protection circuit 150 can be exposed by the through hole 183. In addition, the conductive adhesive 280 is only filled in the through hole 183 of the second isolation layer 180. The outer frame 210 contacts the conductive adhesive 280 such that the ESD protection circuit 150 and the outer frame 210 are electrically connected. Besides, as illustrated in FIG. 23, the touch panel 100 according to the sixth embodiment of the present disclosure may also be optionally combined with the display module 310 to form a touch display panel. The details of combining with the display module 310 are similar to those described in FIG. 20. Therefore, the details are omitted here. Other details in structure of the sixth embodiment are similar to those of the fifth embodiment, and therefore the details are also omitted here.

In addition, according to the sixth embodiment of the present disclosure, the passivation layer 270 may be also added between the testing line 140 and the substrate 110 to avoid moisture to penetrate in the substrate 110. Therefore, the risk of rusting internal metal lines of the touch panel 100 can be further reduced. Other details in structure of the sixth embodiment are similar to those of the third embodiment, and therefore the details are also omitted here.

Figure 25:
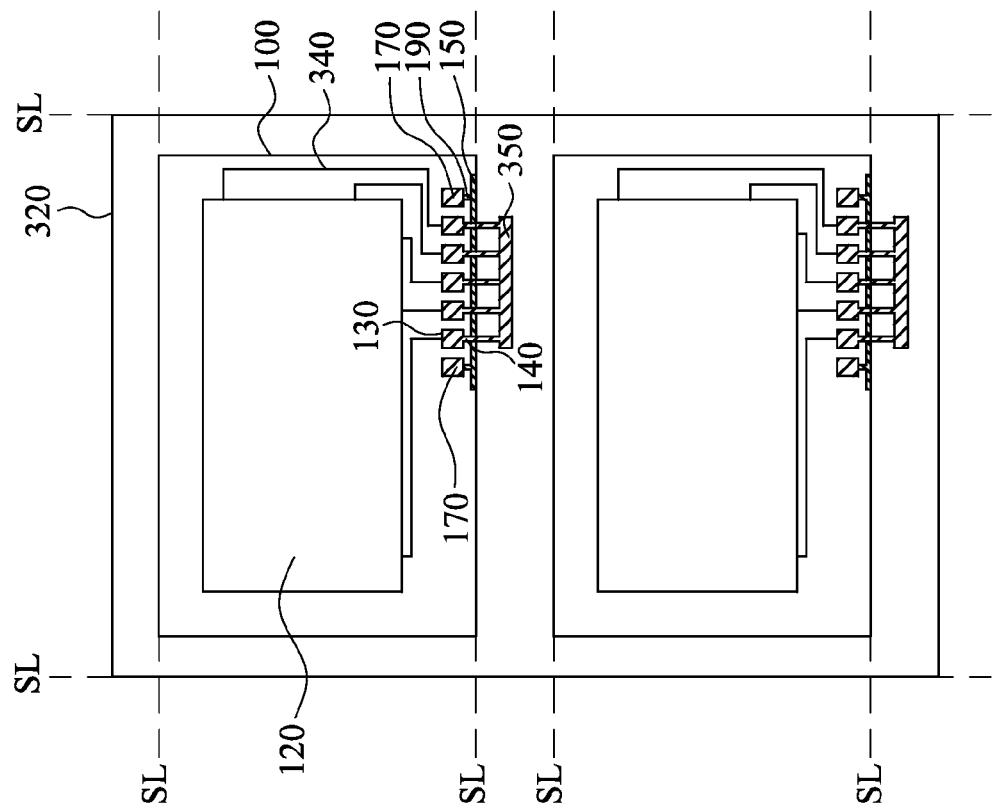
FIG. 24-25 illustrates a method of manufacturing a touch display panel according to various embodiments of the present disclosure.
Figure 24:
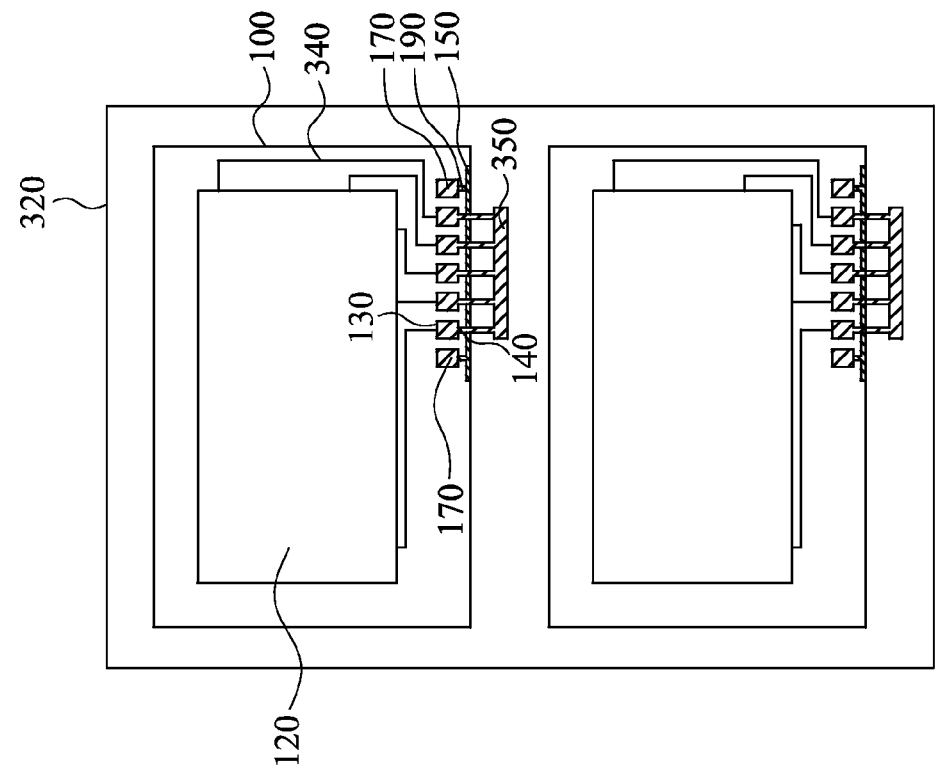

FIG. 24 and FIG. 25 illustrate a method of manufacturing a touch display panel according to various embodiments of the present disclosure. Referring to FIG. 24, the method includes forming aforementioned touch-sensing units 120, connecting pads 130, testing lines 140 and ESD protection circuits 150 on a motherboard 320. The connecting pad 130 is electrically connected to the touch-sensing unit 120 through, for example, a metal line 340. And the testing line 140 is electrically connected to the connecting pad 130. Next, inputting a testing signal through the testing line 140 to test the touch-sensing unit 120. The operation of testing the touch-sensing unit 120 may be performed by inputting signals from a testing pad 350 to the testing line 140, the connecting pad 130, the metal line 340, and the touch-sensing unit 120. Therefore, the touch-sensing unit 120 is tested by inputting signals from the testing pad 350. However, the present disclosure is not limited thereto.

Referring to FIG. 25, after the operation of inputting the testing signal through the testing line 140 to test the touch-sensing unit 120 is completed. The motherboard 320, the testing line 140 and the ESD protection circuit 150 are cut along scriber lines SL to form respective touch panels 100. It should be noticed that part of the scriber line SL goes through the testing line 140 and the ESD protection circuit 150 of the touch panel 100 simultaneously, such that both of the testing line 140 and the ESD protection circuit 150 are exposed from a side of the touch panel 100. Therefore, the touch panel 100 according to various aforementioned embodiment of the present disclosure is formed.

Next, an electrostatic test to the touch panel 100 is performed. As aforementioned, since both of the testing line 140 and the ESD protection circuit 150 are exposed from a side of the touch panel 100, and the ESD protection circuit 150 is electrically connected to the ground potential, the static electricity of the electrostatic test would be conducted and transferred to the ground potential through the ESD protection circuit 150 instead of entering the touch panel through the testing line 140. Therefore, the risk of damaging devices, which are electrically connected to the testing line 140, can be reduced.

After the operation of performing the electrostatic test to the touch panel is completed, assemble the touch panel 100 and a display panel (not shown) to form a touch display panel. In various embodiments of the present disclosure, the combination of the touch panel 100 and the display panel may be in-cell, out-cell, or other suitable combinations.

Although the present invention has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims.

What is claimed is:

1. A touch panel, comprising:
   a substrate;
   at least one touch-sensing unit disposed on the substrate;
   at least one connecting pad disposed on the substrate, the connecting pad electrically connected to the touch-sensing unit;
   at least one testing line disposed on the substrate, the testing line electrically connected to the connecting pad and extending to at least one edge of the substrate, wherein the testing line is in continuous physical contact with the connecting pad;
   at least one ESD protection circuit disposed at the edge of the substrate, wherein a vertical projection of the testing line on the substrate at least partially overlaps a vertical projection of the ESD protection circuit on the substrate; and
   a first isolation layer disposed between the testing line and the ESD protection circuit.

2. The touch panel of claim 1, wherein the ESD protection circuit is disposed between the substrate and the testing line.

3. The touch panel of claim 1, wherein the testing line is disposed between the substrate and the ESD protection circuit.

4. The touch panel of claim 1, further comprising:
   at least one grounding pad disposed on the substrate;
   a second isolation layer covering the substrate, the touch-sensing unit, the testing line, the ESD protection circuit and the first isolation layer, the second isolation layer having at least one through hole to expose the grounding pad; and
   at least one ESD connecting line electrically connected to the ESD protection circuit and the grounding pad.

5. The touch panel of claim 4, wherein the first isolation layer is disposed between the ESD connecting line and the testing line.

6. The touch panel of claim 4, wherein the ESD connecting line comprises a line portion and a plug portion, the first isolation layer is disposed between the ESD protection circuit and the line portion, the first isolation layer has at least one through hole, and the plug portion of the ESD connecting line penetrates the through hole of the first isolation layer to be electrically connected the ESD protection circuit.

7. The touch panel of claim 1, further comprising:
   an outer frame electrically connected to the ESD protection circuit;
   a second isolation layer covering the substrate, the touch-sensing unit, the testing line, the ESD protection circuit and the first isolation layer, and the second isolation layer having at least one through hole to expose the connecting pad;
   a flexible circuit board electrically connected to the connecting pad through the through hole of the second isolation layer; and
   a printed circuit board assembly electrically connected to the flexible circuit board.

8. The touch panel of claim 1, wherein the testing line is disposed between the substrate and the ESD protection circuit, and the touch panel further comprises:
   an outer frame electrically connected to the ESD protection circuit;
   a second isolation layer covering the substrate, the touch-sensing unit, the testing line and the first isolation layer, the second isolation layer having at least one through hole exposing at least partial of the ESD protection circuit; and
   a conductive adhesive filled in the through hole of the second isolation layer to electrically connect the ESD protection circuit and the outer frame.

9. The touch panel of claim 1, wherein the ESD protection circuit is disposed between the substrate and the testing line, the touch panel further comprises:
   an outer frame electrically connected to the ESD protection circuit;
   a second isolation layer covering the substrate, the touch-sensing unit, the testing line and the first isolation layer, the second isolation layer having at least one through hole, the first isolation layer also having at least one through hole, wherein the through hole of the first isolation layer and the through hole of the second isolation layer are connected with each other to expose at least a portion of the ESD protection circuit; and a conductive adhesive filled in the through hole of the first isolation layer and the through hole of the second isolation layer such that the ESD protection circuit and the outer frame are electrically connected.

10. The touch panel of claim 1, wherein the material of the ESD protection circuit comprises titanium, molybdenum, chromium, iridium, aluminum, copper, silver, gold, indium tin oxide, indium zinc oxide or combinations thereof, a resistance of the ESD protection circuit is less than or equal to that of the testing line, the ESD protection circuit crosses the testing line, a line width of the ESD protection circuit is substantially 150-2000 μm; and the touch panel further comprises:

a second isolation layer covering the substrate, the touch-sensing unit, the testing line, the ESD protection circuit and the first isolation layer, wherein a side surface of the ESD protection circuit is exposed by the first isolation layer or the second isolation layer.

11. A method of manufacturing a touch display panel, comprising:

forming at least one touch-sensing unit, at least one connecting pad, at least one testing line and at least one ESD protection circuit on a motherboard, wherein the connecting pad is electrically connected to the touch-sensing unit, and the testing pad is electrically connected to and in continuous physical contact with the connecting pad;

inputting a testing signal through the testing line to test the touch-sensing unit;

cutting the motherboard, the testing line and the ESD protection circuit along at least one cutting line to form at least one touch panel, wherein both of the testing line and the ESD protection circuit are exposed from a side surface of the touch panel, and the connecting pad is electrically connected to the touch-sensing unit;

performing an electrostatic test to the touch panel; and
assembling the touch panel and a display panel.

12. The method of claim 11, further comprising:
providing a conductive adhesive to electrically connect the ESD protection circuit and an outer frame.

* * * * *